(12) United States Patent
Kojima et al.

(10) Patent No.: US 11,820,429 B2
(45) Date of Patent: Nov. 21, 2023

(54) STEERING WHEEL

(71) Applicant: TOYODA GOSEI CO., LTD., Kiyosu (JP)

(72) Inventors: Fumiyasu Kojima, Aichi-ken (JP); Takanori Yamada, Aichi-ken (JP); Sayaka Miyata, Aichi-ken (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 18/160,708

(22) Filed: Jan. 27, 2023

(65) Prior Publication Data

US 2023/0242180 A1 Aug. 3, 2023

(30) Foreign Application Priority Data

Jan. 31, 2022 (JP) .................. 2022-013761

(51) Int. Cl.
*B62D 15/02* (2006.01)
*B62D 1/04* (2006.01)
*F21V 8/00* (2006.01)

(52) U.S. Cl.
CPC ............ *B62D 15/029* (2013.01); *B62D 1/04* (2013.01); *B62D 15/021* (2013.01); *G02B 6/0068* (2013.01)

(58) Field of Classification Search
CPC ...... B62D 15/029; B62D 15/021; B62D 1/04; G02B 6/0068
See application file for complete search history.

(56) References Cited

U.S. PATENT DOCUMENTS

| | | |
|---|---|---|
| 2016/0025281 A1 | 1/2016 | Gardner et al. |
| 2018/0237050 A1 | 8/2018 | Gardner et al. |
| 2020/0278576 A1* | 9/2020 | Tan ............ G02B 6/0033 |
| 2021/0070347 A1 | 3/2021 | Gardner et al. |
| 2021/0206317 A1* | 7/2021 | Marc ............ B60Q 3/283 |
| 2021/0221285 A1 | 7/2021 | Kihara et al. |
| 2022/0258787 A1 | 8/2022 | Gardner et al. |

FOREIGN PATENT DOCUMENTS

| JP | 2017-529272 A | 10/2017 |
|---|---|---|
| JP | 2021-113040 A | 8/2021 |

* cited by examiner

*Primary Examiner* — Mary Ellen Bowman

(74) *Attorney, Agent, or Firm* — POSZ LAW GROUP, PLC

(57) ABSTRACT

The light guide body includes a light source side portion located on the visible light sources side, which is the back surface side of the substrate, and an opening side portion disposed to extend from the back surface side to the front surface side of the substrate while intersecting the light source side portion. The light guide body has a substantially L-shaped cross section. The light guide body is partitioned such that at least regions of the opening side portion are separated from each other at least at one location between the visible light sources with a light shielding member interposed therebetween.

4 Claims, 14 Drawing Sheets

STEERING WHEEL

CROSS-REFERENCE TO RELATED APPLICATION

This application is based on and claims priority under 35 USC 119 from Japanese Patent Application No. 2022-013761 filed on Jan. 31, 2022.

TECHNICAL FIELD

The present disclosure relates to a steering wheel having a configuration in which a light bar is disposed at a predetermined position which can be visually recognized by a driver.

BACKGROUND ART

In the related art, as a steering wheel having a light bar, there is a configuration in which a plurality of visible light sources are arranged side by side on a back surface side of a substrate, and visible light emitted from the visible light sources is diffused through a light guide body formed to have a substantially L-shaped cross section so as to extend from the back surface side to a front surface side of the substrate, and radiated from a radiation opening disposed in a holding member which holds the substrate (for example, see JP-A-2021-113040).

However, in the steering wheel of the related art, since the light guide body is formed in an elongated shape across the plurality of visible light sources substantially along a longitudinal direction of the substrate, even when it is desired to illuminate a partial region of the light bar by turning on only a part of the visible light sources, visible light emitted from the visible light sources is diffused in the light guide body and illuminates the entire light guide body. There is room for improvement in that the light bar is made such that a part of the light bar, which is only a predetermined region of only the visible light sources turned on, is accurately illuminated.

SUMMARY

The present disclosure solves the above-described problem, and an object thereof is to provide a steering wheel capable of accurately illuminating only a partial region of a light bar.

According to an aspect of the present disclosure, there is provided a steering wheel including a light bar disposed at a predetermined position which is capable of being visually recognized by a driver, in which the light bar includes a substrate held by a holding member, and a plurality of visible light sources attached to be arranged side by side substantially along a longitudinal direction of the substrate and configured to emit visible light when turned on, the light bar is configured to emit the visible light during operation from a radiation opening formed by opening a part of the holding member, in which the substrate is held by the holding member to be substantially along an opening surface of the radiation opening, in which the visible light sources are arranged side by side substantially along the longitudinal direction of the substrate on a back surface side of the substrate away from the radiation opening, and visible light emitted by the visible light sources is deflected toward the radiation opening side via a light guide body disposed to extend from the back surface side to a front surface side of the substrate, in which the light guide body includes a light source side portion located on the visible light sources side, which is the back surface side of the substrate, and an opening side portion disposed to extend from the back surface side to the front surface side of the substrate while intersecting the light source side portion, the light guide body has a substantially L-shaped cross section, and in which the light guide body is partitioned such that at least regions of the opening side portion are separated from each other at least at one location between the visible light sources with a light shielding member interposed therebetween.

In the steering wheel according to the present disclosure, the light guide body is partitioned such that at least the regions of the opening side portion disposed to extend from the back surface side to the front surface side of the substrate are separated from each other at the parts between the visible light sources with the light shielding member interposed therebetween. Therefore, for example, when only the visible light source disposed in the region of one opening side portion is turned on, the visible light which illuminates the one opening side portion can be prevented from being diffused to another opening side portion, and the other opening side portion can be prevented from being illuminated. Therefore, in the steering wheel according to the present disclosure, it is possible to accurately illuminate only a part of the opening side portion of the light guide body adjacent to the light shielding member.

Therefore, in the steering wheel according to the present disclosure, it is possible to accurately illuminate only a partial region of the light bar.

In addition, in the steering wheel according to the present disclosure, it is preferable that the light guide body is configured such that only the regions of the opening side portion are partitioned and the light source side portion is integrated, so that as compared with a case in which the light guide body is divided into a plurality of parts including the light source side portion, the handling workability of the light guide body is improved, and the number of manufacturing steps at the time of manufacturing can be reduced.

In addition, in the steering wheel according to the present disclosure, it is preferable that the light bar is curved such that a longitudinal direction thereof is substantially along a circumferential direction of a ring portion to be gripped by the driver, and the light bar is disposed in a front region at a time of straight traveling steering on an upper surface side of the ring portion, and an odd number of the visible light sources are arranged substantially along the circumferential direction of the ring portion, and a center-side visible light source located on a center side is disposed at a position on a front side of a steering center of the ring portion at the time of straight traveling steering.

When the steering wheel is configured as described above, the driver can visually recognize the position on the front side of the steering center of the ring portion at the time of straight traveling steering by turning on or blinking the center-side visible light source disposed at this position, and for example, when the driver wants to recognize a rotation state of the steering wheel at a time of automatic driving or the like, a region in front of the steering center can be accurately visually recognized.

In addition, in the steering wheel according to the present disclosure, it is preferable that the light bar is curved such that a longitudinal direction thereof is substantially along a circumferential direction of a ring portion to be gripped by the driver, and the light bar is disposed in a front region at a time of straight traveling steering on an upper surface side of the ring portion, and a plurality of the visible light sources are arranged substantially along the circumferential direction of the ring portion, and the plurality of the visible light sourced are set such that one or a plurality of the visible light sources are turned on as a steering angle shortage notification mode when a steering angle shortage is detected during traveling by being controlled by a control device.

When the steering wheel is configured as described above, for example, when a steering angle shortage is detected during a curve traveling of the vehicle or the like, one or more visible light sources are turned on as the steering angle shortage notification mode, and the driver can recognize the shortage of rotation of the steering wheel. Therefore, it is possible to accurately reduce the occurrence of an accident due to insufficient rotation of the steering wheel (insufficient turning of the curve during traveling) during the curve traveling. In addition, in the steering wheel having the above-described configuration, the light guide body which guides the visible light emitted from the visible light sources to the radiation opening side is separated from each other with the light shielding members interposed between the visible light sources in the regions of the opening side portion, so that when the visible light source is turned on, only the opening side portion corresponding to the visible light source which is turned on can be accurately illuminated. That is, only a predetermined portion of the light guide body can be accurately illuminated, and the driver can be accurately alerted.

BRIEF DESCRIPTION OF DRAWINGS

FIG. 6 is a partially enlarged plan view in which FIG. 5 is further enlarged.

DESCRIPTION OF EMBODIMENTS

Figure 1:
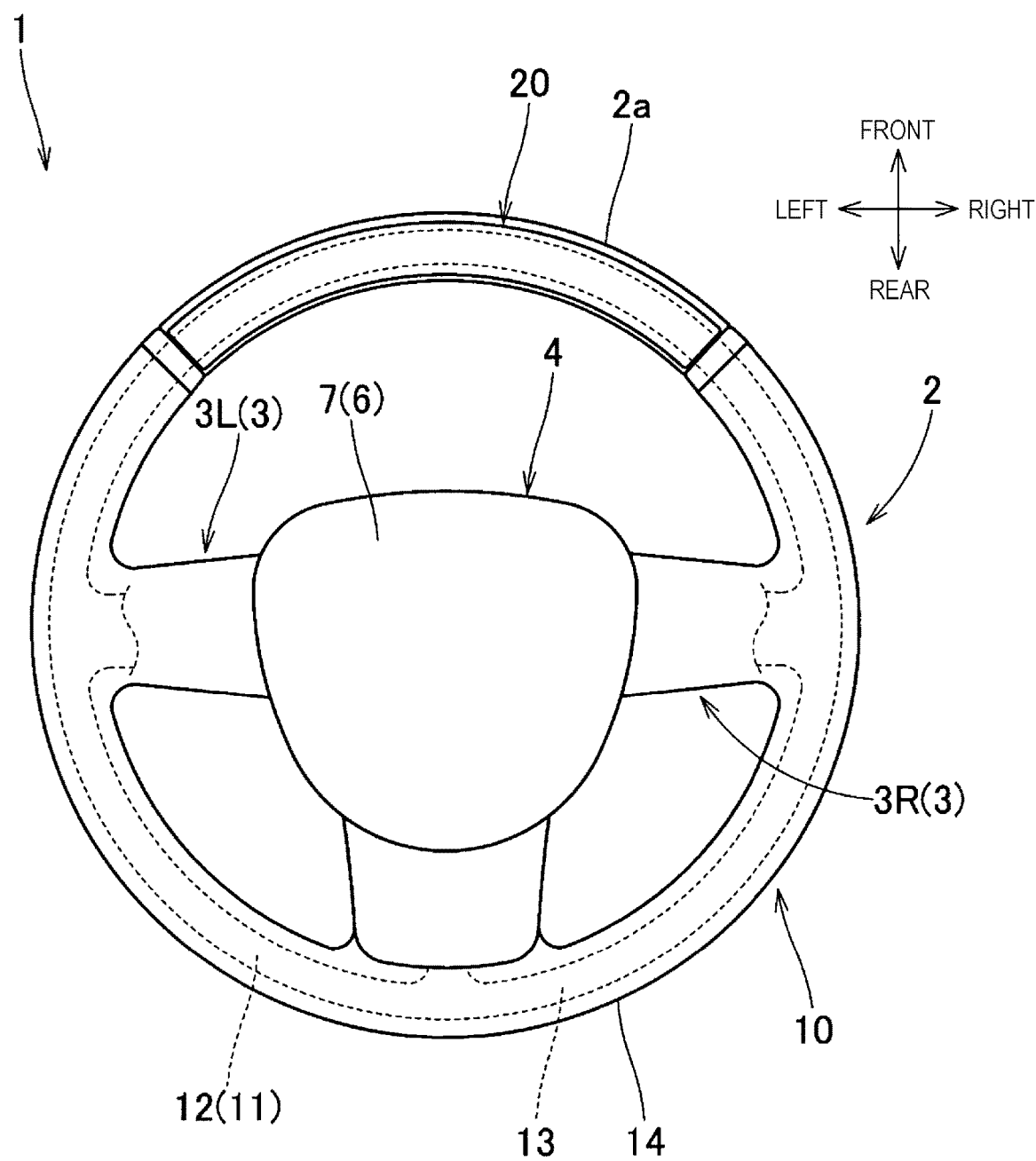
FIG. 1 is a plan view of a steering wheel according to an embodiment of the present disclosure.

Hereinafter, an embodiment of the present disclosure will be described with reference to the drawings. As illustrated in FIG. 1, a steering wheel 1 according to the embodiment includes an annular ring portion 2 which is gripped during rotational steering, a boss portion 4 which is disposed substantially at the center of the ring portion 2, and a plurality of (three in the embodiment) spoke portions 3 which couple the ring portion 2 and the boss portion 4, and includes an airbag device 6 above the boss portion 4, a light bar 20 disposed in the ring portion 2, a steering wheel body 10 as components.

In the present description, unless otherwise specified, a front-rear direction, an upper-lower direction, and a left-right direction are defined based on a straight traveling steering state of the steering wheel 1 mounted on a vehicle, such that a direction along a rotation center axis (steering center) of the ring portion 2 is defined as the upper-lower direction, a direction perpendicular to the rotation center axis of the ring portion 2 and substantially along a front-rear direction of the vehicle is defined as the front-rear direction, and a direction perpendicular to the rotation center axis of the ring portion 2 and substantially along a left-right direction of the vehicle is defined as the left-right direction.

The airbag device 6 disposed above the boss portion 4 includes an airbag (not illustrated) which is folded and housed, an inflator (not illustrated) which supplies inflation gas to the airbag, and a pad 7 which covers an upper surface side of the folded airbag. As illustrated in FIG. 1, the pad 7 is disposed so as to cover an entire upper surface side of the boss portion 4.

Figure 3:
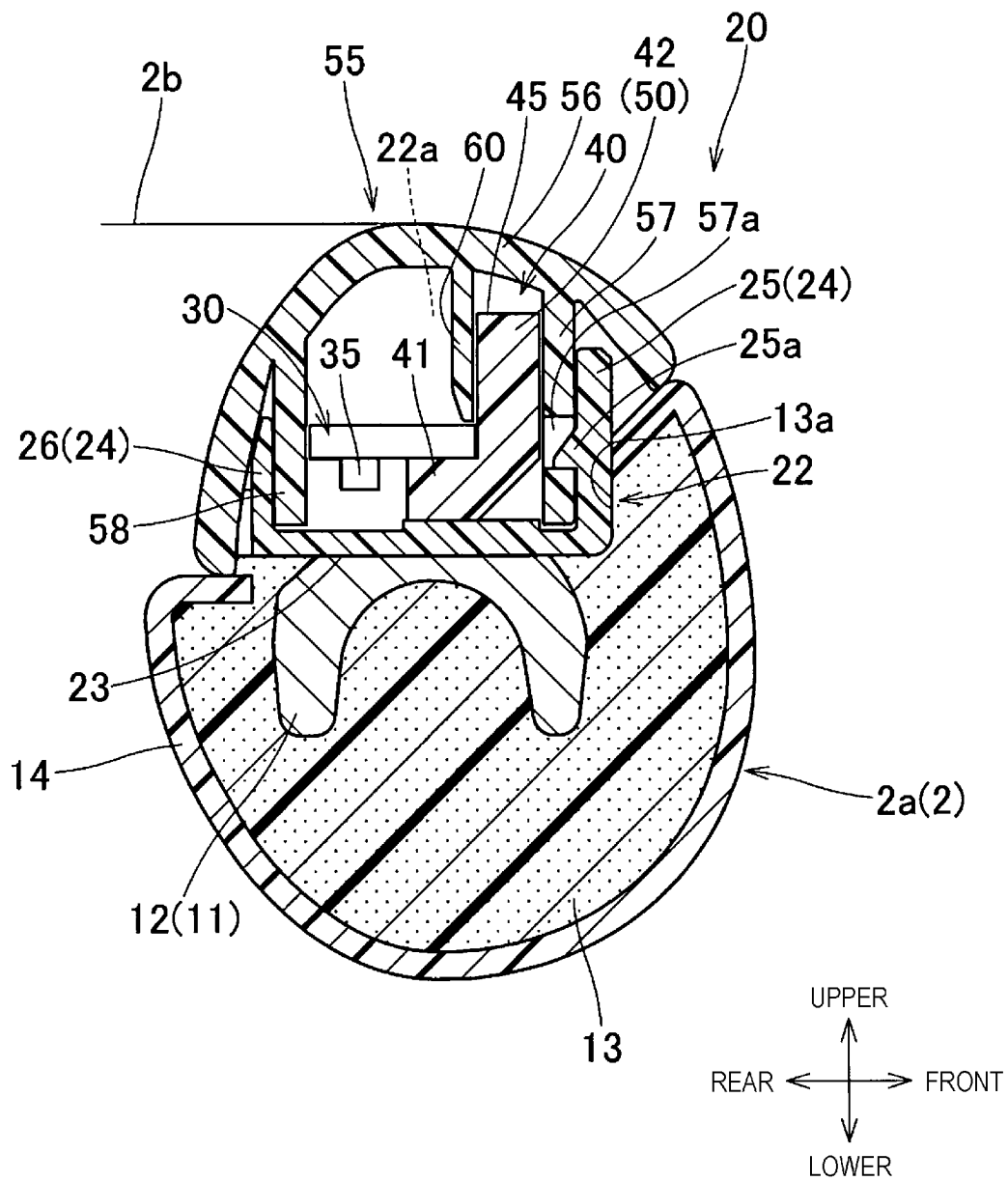
FIG. 3 is a cross-sectional view of the steering wheel according to the embodiment, and is a view corresponding to a part taken along line in FIG. 2.
Figure 4:
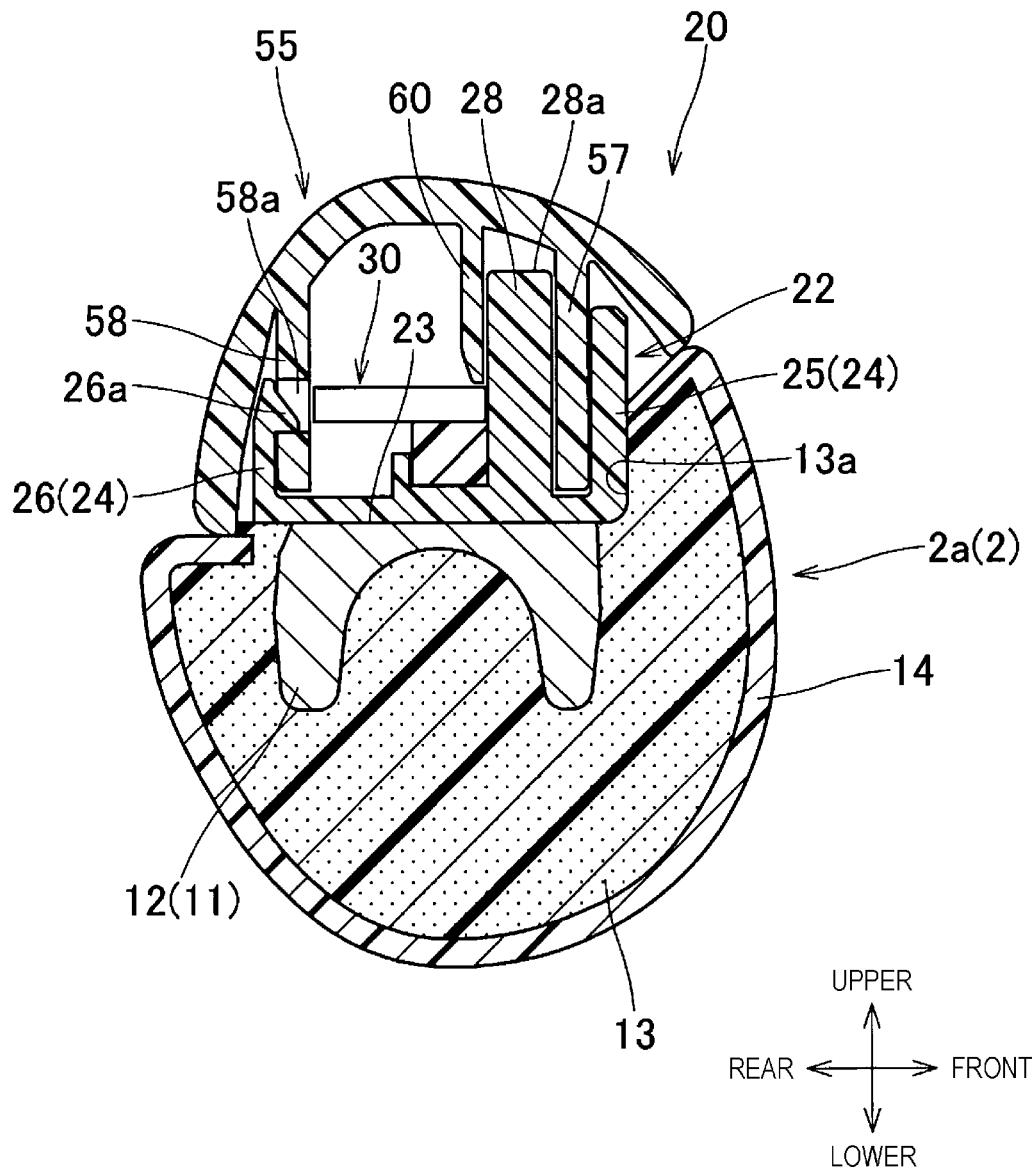
FIG. 4 is a cross-sectional view of the steering wheel according to the embodiment, and is a view corresponding to a part taken along line IV-IV in FIG. 2.
Figure 5:
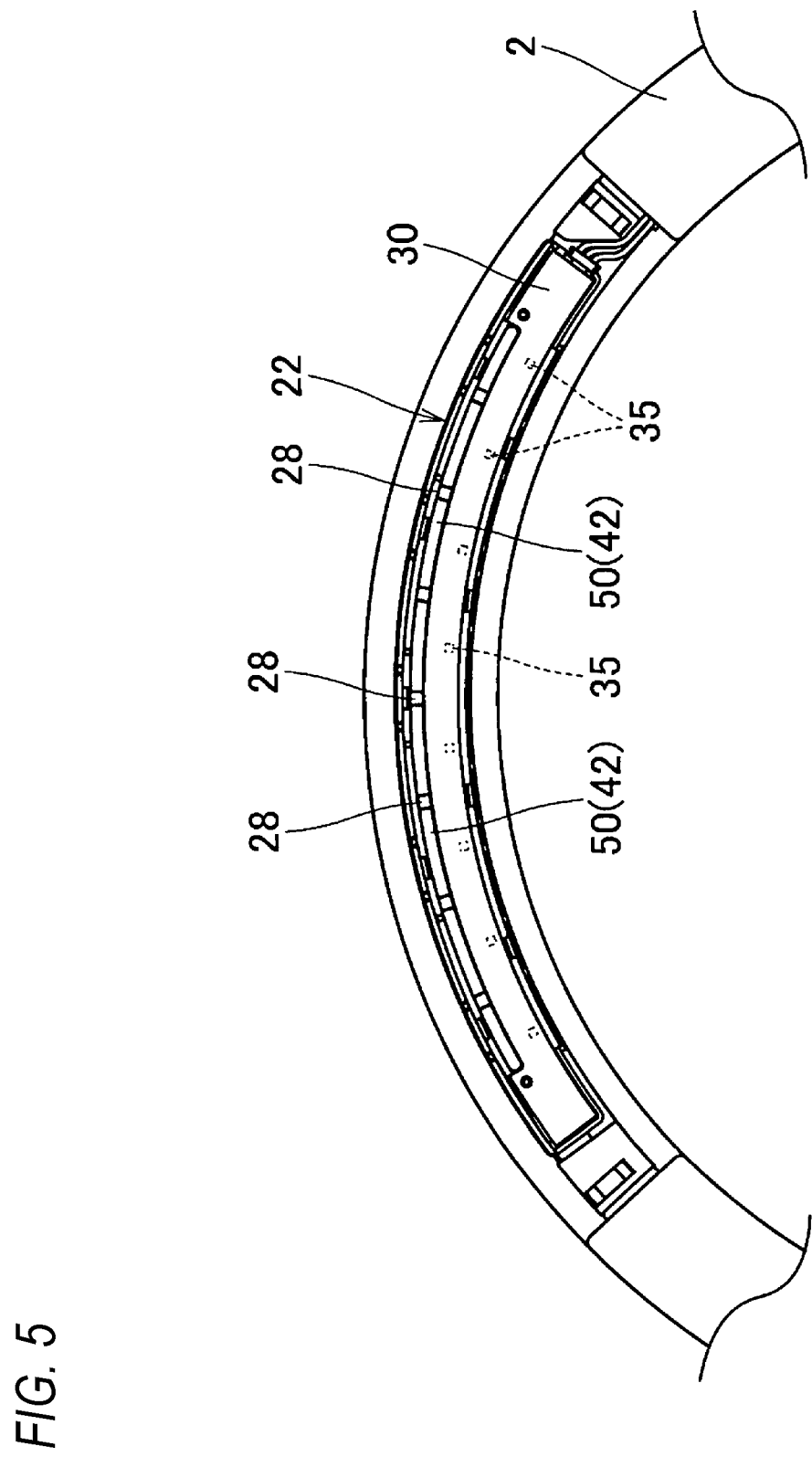
FIG. 5 is a partially enlarged plan view illustrating the light bar in a state in which a cover portion is removed in the steering wheel of the embodiment.
Figure 6:
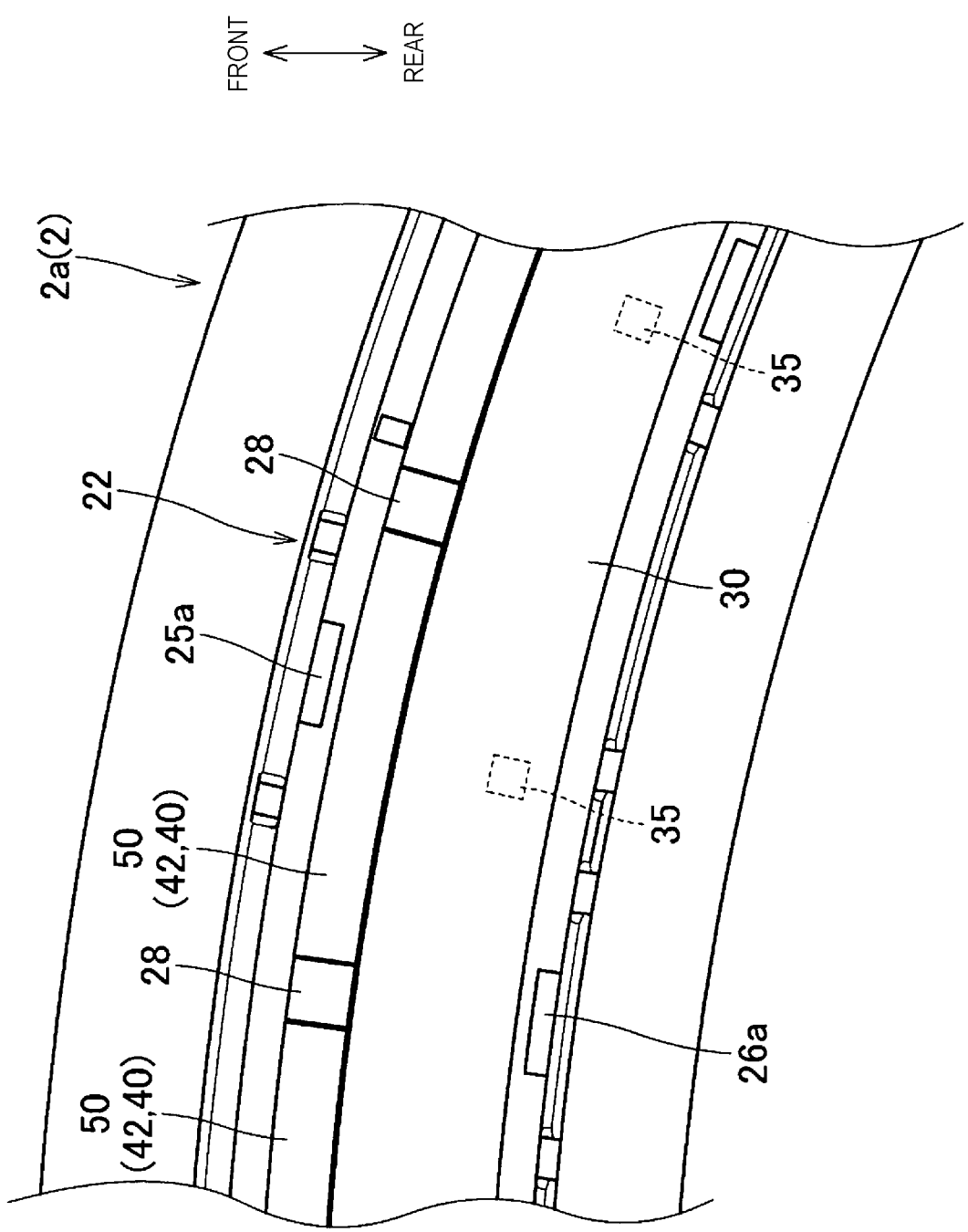
Figure 7:
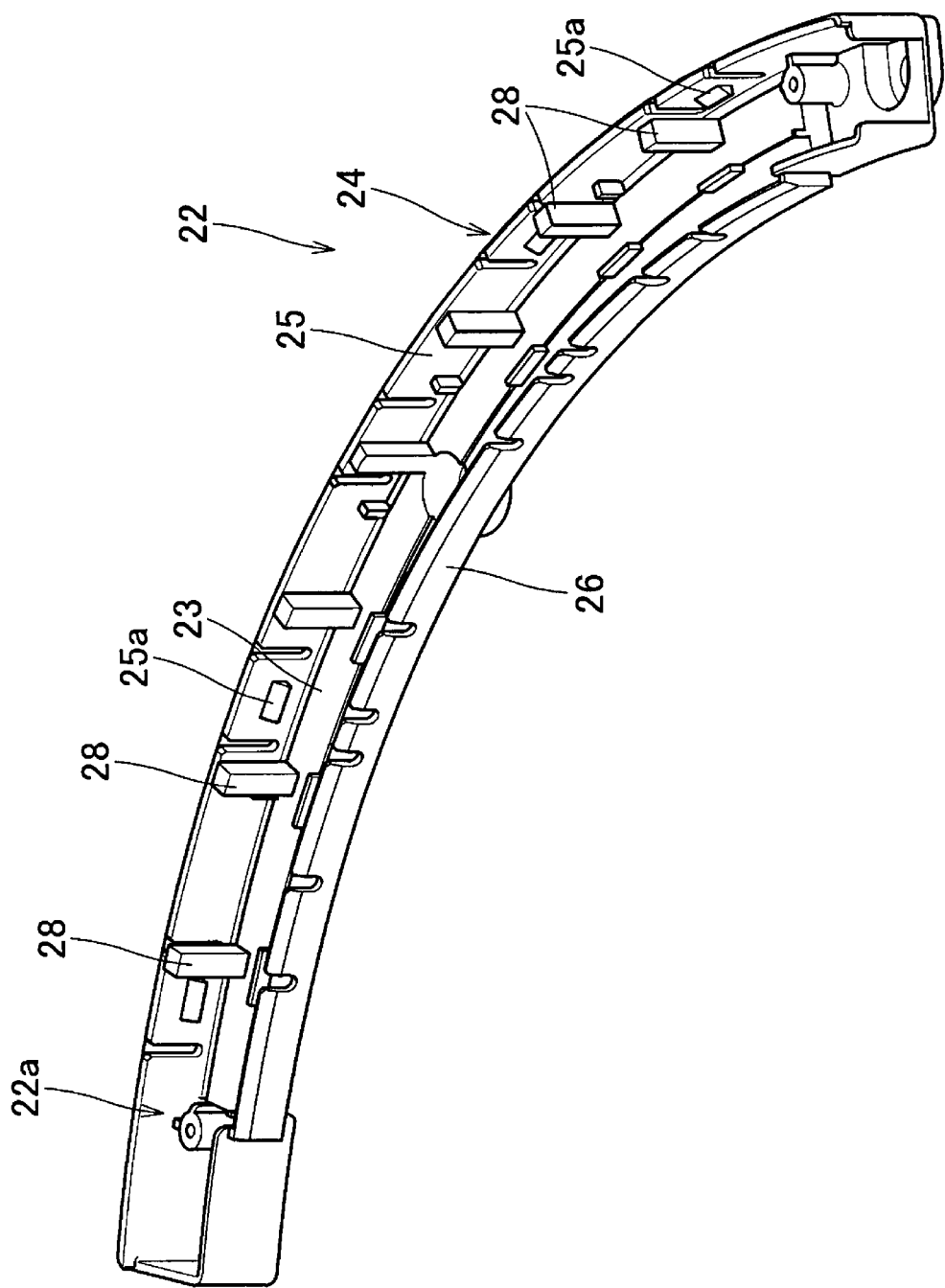
FIG. 7 is a schematic perspective view of a case used in the light bar of the steering wheel according to the embodiment.

As illustrated in FIGS. 1, 3, and 4, the steering wheel body 10 includes a core metal 11 as a core material disposed so as to couple the ring portion 2, the boss portion 4, and the spoke portions 3 to each other, a covering layer 13 covering a periphery of the core metal 11 at portions of the ring portion 2 and the spoke portions 3, an outer covering layer 14 covering an outer peripheral surface side of the ring portion 2 which is an outer peripheral side of the covering layer 13, and a lower cover (not illustrated) covering a lower surface side of the boss portion 4.

The core metal 11 is made of a metal such as an aluminum alloy. In the core metal 11, a ring portion core metal 12 disposed at the part of the ring portion 2 has a substantially inverted U-shape in a cross section (see FIGS. 3 and 4).

The covering layer 13 is formed of a soft synthetic resin having cushioning properties, and in the embodiment, the covering layer 13 is formed of a soft foamed material such as foamed polyurethane. As illustrated in FIGS. 3 and 4, the covering layer 13 is configured to cover the outer peripheral side of the ring portion metal core 12 at the part of the ring portion 2, and has a substantially elliptical cross-sectional shape. In addition, the covering layer 13 has a recessed portion 13a for housing the light bar 20 (case 22) in a region where the light bar 20 is disposed (see FIGS. 3 and 4). The outer covering layer 14 is disposed so as to cover the outer peripheral side of the covering layer 13 except for the region where the light bar 20 is disposed. In the embodiment, the outer covering layer 14 is formed of a sheet body made of synthetic resin or leather such as natural leather, synthetic leather, or artificial leather.

Figure 2:
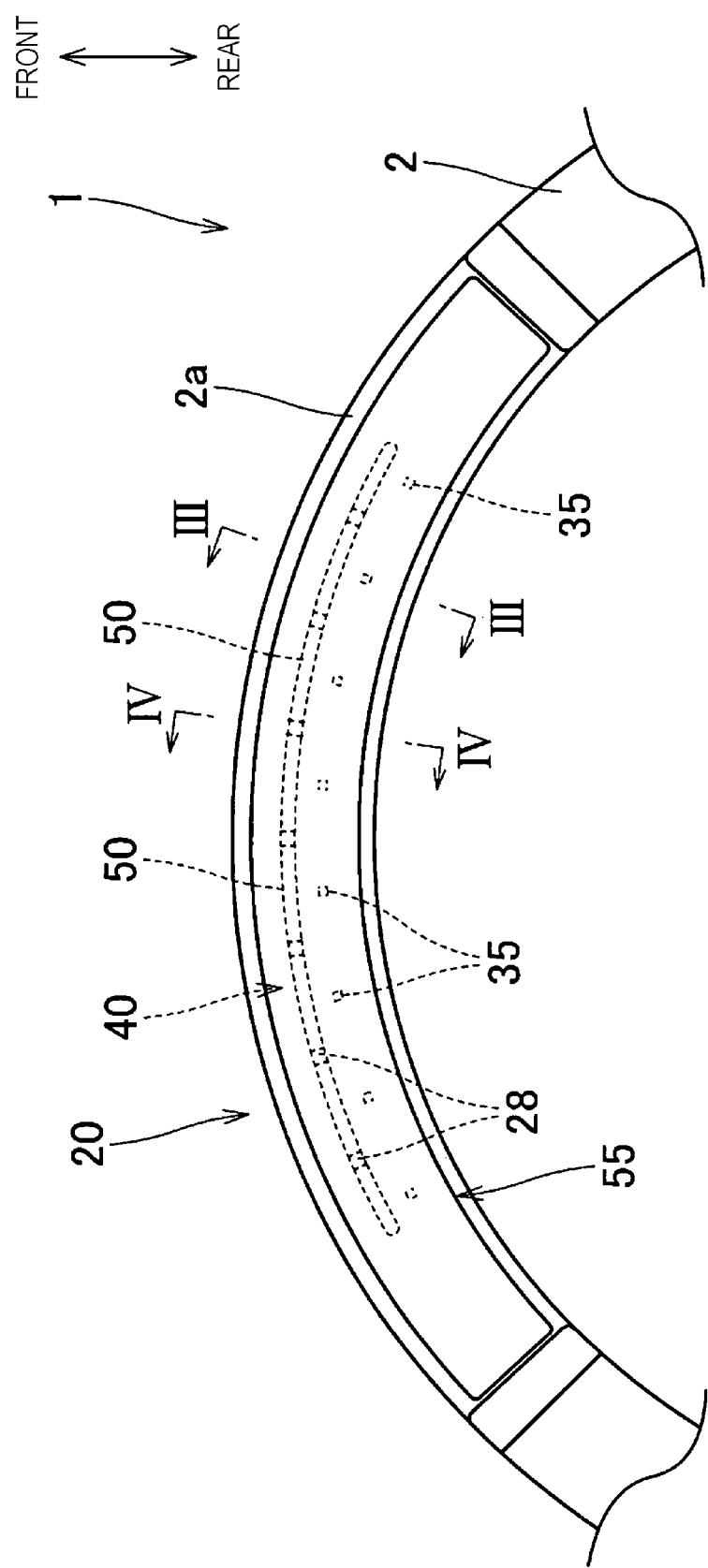
FIG. 2 is a partially enlarged plan view illustrating a light bar in the steering wheel of the embodiment.

The light bar 20 is disposed at a predetermined position visible to a driver (not illustrated) in the steering wheel 1, and in the embodiment, as illustrated in FIGS. 1 and 2, in the ring portion 2 to be gripped by the driver during steering, the light bar 20 is disposed on an upper surface side of a front side portion 2a (a region on a front side during straight traveling steering) between the left spoke portion 3L and the right spoke portion 3R, and is curved such that a longitudinal direction thereof is substantially along a circumferential direction of the ring portion 2. Specifically, an outer shape of the light bar 20 as viewed from an upper side is a substantially band shape curved such that the longitudinal direction is substantially along the circumferential direction of the ring portion 2, the light bar 20 is continuously formed in a region of about ¼ of the ring portion 2, and the light bar 20 is disposed such that the center in the longitudinal direction substantially coincides with a front end of the ring portion 2.

As illustrated in FIGS. 2 to 7, the light bar 20 includes a case 22 as a holding member, a substrate 30 housed and held in the case 22, a plurality of visible light sources (visible light LEDs 35) attached so as to be arranged substantially along the longitudinal direction of the substrate 30, a light guide body 40, and a cover portion 55 covering a radiation opening 22a to be described later and formed in the case 22.

In the embodiment, the case 22 as the holding member has a substantially box shape with an open on the upper side, is curved so as to substantially conform to the curved shape of the ring portion 2 when viewed from the upper-lower direction (see FIGS. 5 and 7), and is made of a synthetic resin (in the embodiment, made of a black polycarbonate resin) which cannot transmit visible light VL emitted from the visible light LED 35. Specifically, the case 22 includes a bottom wall portion 23 which is disposed substantially along a ring surface 2b of the ring portion 2 and has a substantially band shape which is curved when viewed from the upper-lower direction, and a peripheral wall portion 24 which extends upward from an outer peripheral edge of the bottom wall portion 23. The radiation opening 22a which can radiate visible light VL during operation is disposed on an upper end side of the peripheral wall portion 24. In the peripheral wall portion 24, locking protrusions 25a and 26a for locking attachment wall portions 57 and 58, which will be described later, of the cover portion are formed at a plurality of positions along the longitudinal direction of the case 22 on a front side wall 25 and a rear side wall 26 facing each other in the front-rear direction (an inward-outward direction of the ring portion 2). Specifically, the locking protrusions 25a formed on the front side wall 25 and the locking protrusions 26a formed on the rear side wall 26 are formed at positions shifted from each other in the longitudinal direction of the case 22 (see FIG. 6). In the embodiment, the front side wall 25 and the rear side wall 26 are disposed to cover an outside of the attachment wall portions 57 and 58 when the cover portion 55 is attached (see FIGS. 3 and 4), and the locking protrusions 25a and 26a are disposed so as to protrude to an inside which is the attachment wall portions 57 and 58 side. In addition, the case 22 of the embodiment includes partition wall portions 28 constituting light shielding members that partition opening side portion 42, which will be described later, of the light guide body 40. As illustrated in FIG. 4, the partition wall portion 28 is formed to protrude upward from the bottom wall portion 23, and a width dimension thereof is set to be substantially the same as that of the opening side portion 42 (divided body 50), and a length dimension (protrusion height) thereof in the upper-lower direction is set to be a dimension such that an upper surface 28a thereof substantially coincides with an upper surface (light emission surface 45) of the opening side portion 42 (see FIGS. 3 to 6). The partition wall portion 28 is disposed so as to fill a space formed in the opening side portion 42 (between the divided bodies 50) with substantially no gap, and to be continuous with the opening side portion 42. In the embodiment, seven partition wall portions 28 are formed so as to partition the opening side portion 42 divided into eight parts (divided bodies 50) as described later (see FIG. 5). In the embodiment, a length dimension of the partition wall portion 28 in the circumferential direction of the ring portion 2 is set to about ⅙ of the divided body 50 formed by dividing the opening side portion 42.

The substrate 30 is disposed substantially along the bottom wall portion 23 in the case 22 (see FIGS. 3 and 4). That is, the substrate 30 is disposed substantially along an opening surface of the radiation opening 22a of the case 22 and substantially along the ring surface 2b of the ring portion 2. Further, the substrate 30 has a substantially band shape curved along the longitudinal direction so as to substantially follow the case 22, that is, the ring portion 2 (see FIG. 5). The substrate 30 is disposed over substantially the entire region in the longitudinal direction of the case 22, and is held by the case 22 by attaching a predetermined portion (not illustrated) to the case 22.

The visible light LEDs 35 are used as a visible light source which emits visible light at the time of turning-on. In the embodiment, a visible light LED capable of emitting red light, green light, and blue light is used as the visible light LED 35. As illustrated in FIG. 3, the plurality of visible light LEDs 35 are arranged side by side substantially along the longitudinal direction of the substrate 30 (substantially along the circumferential direction of the ring portion 2) on a back surface (lower surface 30b) side of the substrate 30 away from the radiation opening 22a. In the embodiment, the visible light LEDs 35 are scattered at eight positions over substantially the entire region in the longitudinal direction of the substrate 30 (light guide body 40) (see FIGS. 2 and 5). Specifically, each of the visible light LEDs 35 is attached to the lower surface 30b side of the substrate 30 at a position slightly behind the center in a width direction (inside in the inward-outward direction of the ring portion 2) so as to be capable of emitting visible light VL toward a front side (outside) which is the light guide body 40 side (see FIG. 9). The visible light LED 35 is electrically connected to an operation circuit (not illustrated), and receives an operation signal from the operation circuit (not illustrated) so that the visible light LED 35 disposed at a predetermined position can be turned on to emit visible light VL of a predetermined color.

Figure 9:
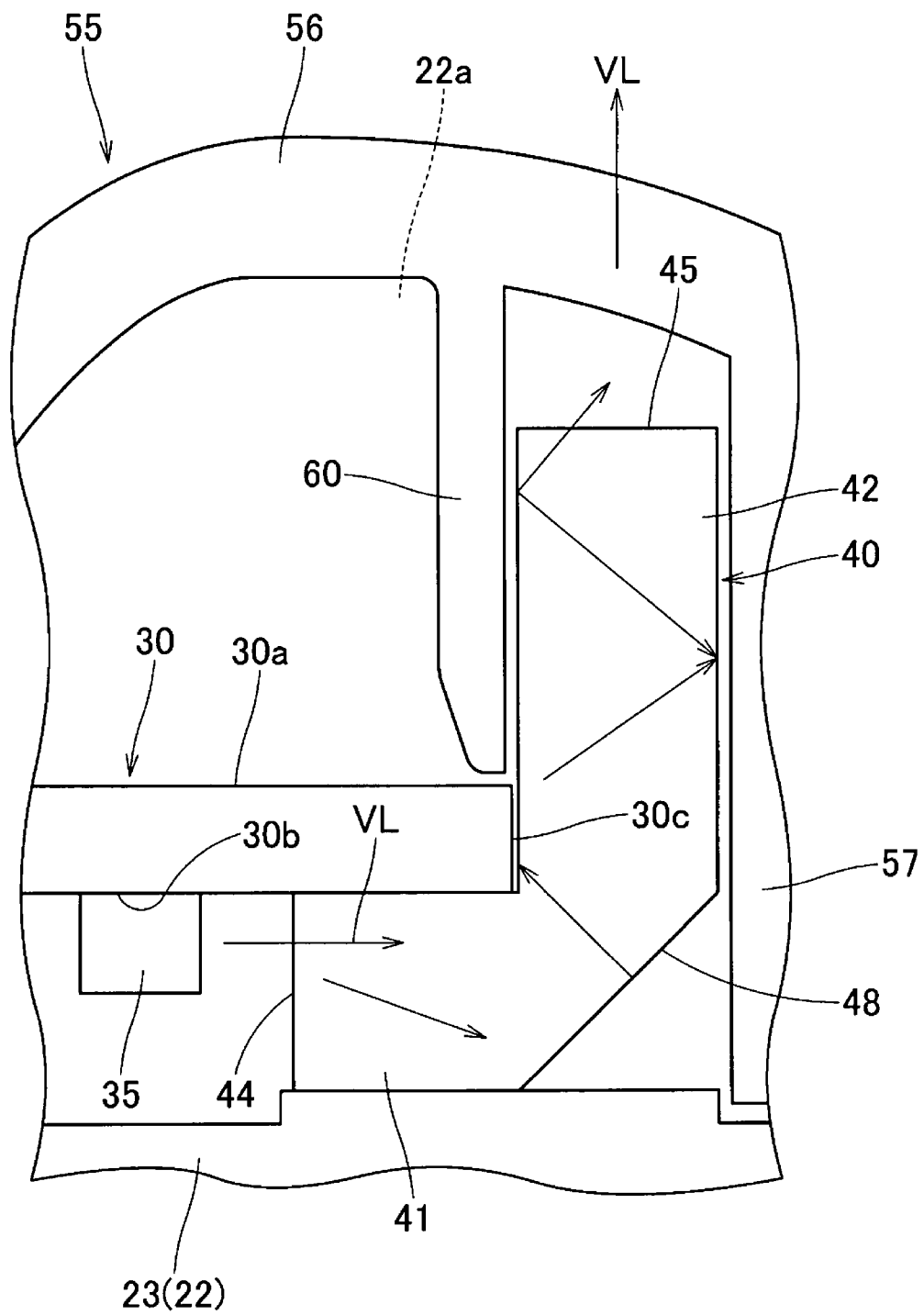
FIG. 9 is a partially enlarged schematic cross-sectional view illustrating a vicinity of the light guide body in the steering wheel according to the embodiment, and is a view illustrating a diffusion state of visible light.

The light guide body 40 is disposed in a region excluding both left and right end sides of the case 22, and as illustrated in FIGS. 2, 5, 8A, and 8B, is formed to be curved in a substantially arc shape so as to substantially conform to the curved shape of the ring portion 2 when viewed from the upper-lower direction. The light guide body 40 is disposed to extend from the back surface (lower surface 30b) side to a front surface (upper surface 30a) side of the substrate 30 so as to pass through a front end 30c of the substrate 30 (see FIGS. 3 and 9). Specifically, the light guide body 40 includes a light source side portion 41 positioned on the visible light LED 35 side which is the back surface (lower surface 30b)

side of the substrate and the opening side portion 42 disposed so as to extend from the back surface (lower surface 30b) side to the front surface (upper surface 30a) side of the substrate 30 while intersecting the light source side portion 41, and is formed in a substantially L-shaped cross section. In the embodiment, the opening side portion 42 is disposed such that an upper end is positioned on the cover portion 55 side through the front side of the substrate 30. In the embodiment, the light guide body 40 is configured such that a thickness dimension is substantially constant from the light source side portion 41 to the opening side portion 42, and the thickness dimension is larger than a width dimension of the visible light LED 35 in the upper-lower direction, so that the light source side portion 41 covers the front of the visible light LED 35 from above and below (see FIG. 9). The light guide body 40 is formed of a synthetic resin such as a polycarbonate resin or an acrylic resin. As illustrated in FIG. 9, an incident surface 44 on which the visible light VL emitted from the visible light LED 35 is incident is disposed on a distal end surface (an end surface on the visible light LED 35 side) of the light source side portion 41, and the light emission surface 45 which emits the visible light VL upward toward the radiation opening 22a side is disposed on an upper surface of the opening side portion 42. In addition, in the vicinity of an intersection portion between the light source side portion 41 and the opening side portion 42 (a lower end side of the opening side portion 42), a reflection surface 48 capable of reflecting the visible light VL incident from the incident surface 44 so as to deflect the visible light VL toward the light emission surface 45 side (upward) disposed on the radiation opening 22a side is disposed at a position facing the incident surface 44 (see FIG. 9).

In addition, in the embodiment, the light guide body 40 is partitioned such that at least the regions of the opening side portion 42 are separated from each other at parts between the visible light LEDs 35. Specifically, the light guide body 40 is configured such that the opening side portion 42 is separated over the entire upper and lower regions including the vicinity of a boundary portion with the light source side portion 41 on the lower end side, and the light source side portion 41 is integrated (see FIGS. 8A and 8B). The opening side portion 42 is divided into eight divided bodies 50 corresponding to the eight visible light LEDs arranged, and each of the divided bodies 50 formed by dividing the opening side portion 42 is configured such that the visible light LED 35 is disposed substantially at the center in the longitudinal direction (the circumferential direction of the ring portion 2) (see FIGS. 2 and 5). In addition, as described above, the partition wall portions 28 extending from the bottom wall portion 23 of the case 22 are disposed between the divided bodies 50 so as to be continuous with the opening side portion 42 (divided bodies 50) and to fill the space between the divided bodies 50 with substantially no gap (see FIGS. 3, 4, and 6).

The cover portion 55 includes a cover main body 56 which covers substantially the entire surface of the radiation opening 22a formed in the case 22 as the holding member, and the attachment wall portions 57 and 58 which extend downward from the cover main body 56 and are attached to the case 22. The cover main body 56 is configured such that the cross-sectional shape thereof is curved so as to be smoothly continuous from an outer peripheral surface of the outer covering layer 14 in the ring portion 2 (see FIGS. 3 and 4). The attachment wall portions 57 and 58 are disposed close to the inside of the front side wall 25 and the rear side wall 26 in the case 22, and have locking holes 57a and 58a into which the locking protrusions 25a and 26a formed so as to protrude inward in the front side wall 25 and the rear side wall 26 are inserted to be locked (see FIGS. 3 and 4). The attachment wall portion 57 disposed on the front side is configured to be attached to the front side wall 25 so as to enter a gap between the light guide body 40 (specifically, the opening side portion 42 (the divided body 50) of the light guide body 40 and the partition wall portion 28 of the case 22) and the front side wall 25. In addition, the cover portion 55 is disposed such that a pressing wall portion 60, which is disposed in the vicinity of a rear side of the opening side portion 42 of the light guide body 40 and the partition wall portion 28 extending from the case 22, protrudes downward from the cover main body 56. The cover portion 55 is configured to allow the visible light VL emitted from the visible light LED 35 to pass through. In the embodiment, the cover portion 55 is made of a transparent black synthetic resin having translucency. Specifically, the cover portion 55 is formed of a polycarbonate resin, an acrylic resin, or the like.

Figure 10A:
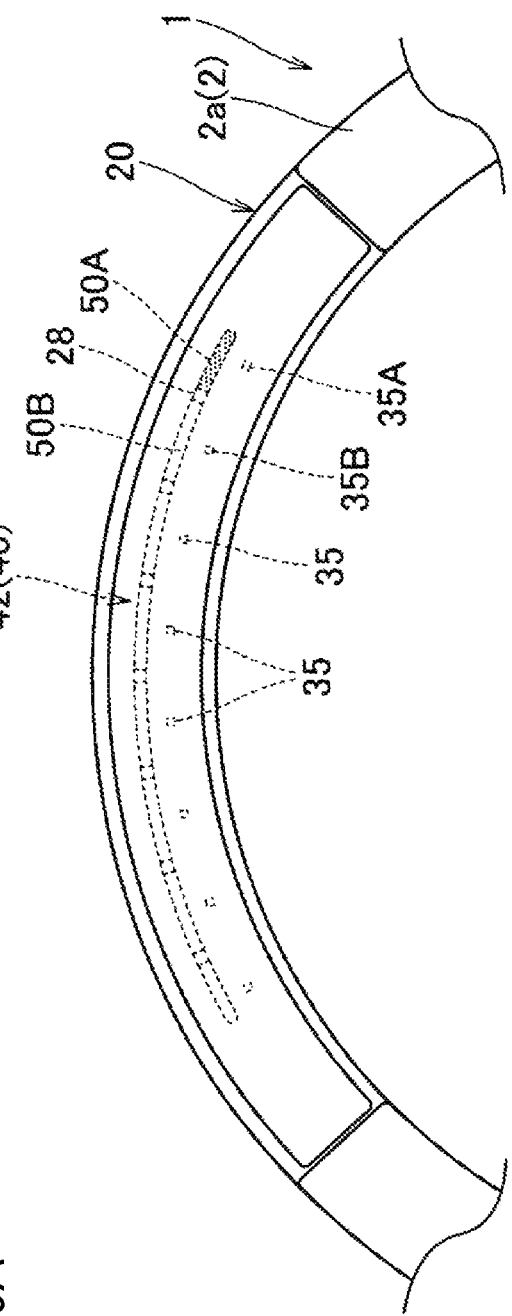
FIGS. 10A and 10B are schematic partial enlarged plan views illustrating a state in which a visible light LED is turned on in the steering wheel according to the embodiment.
Figure 10B:
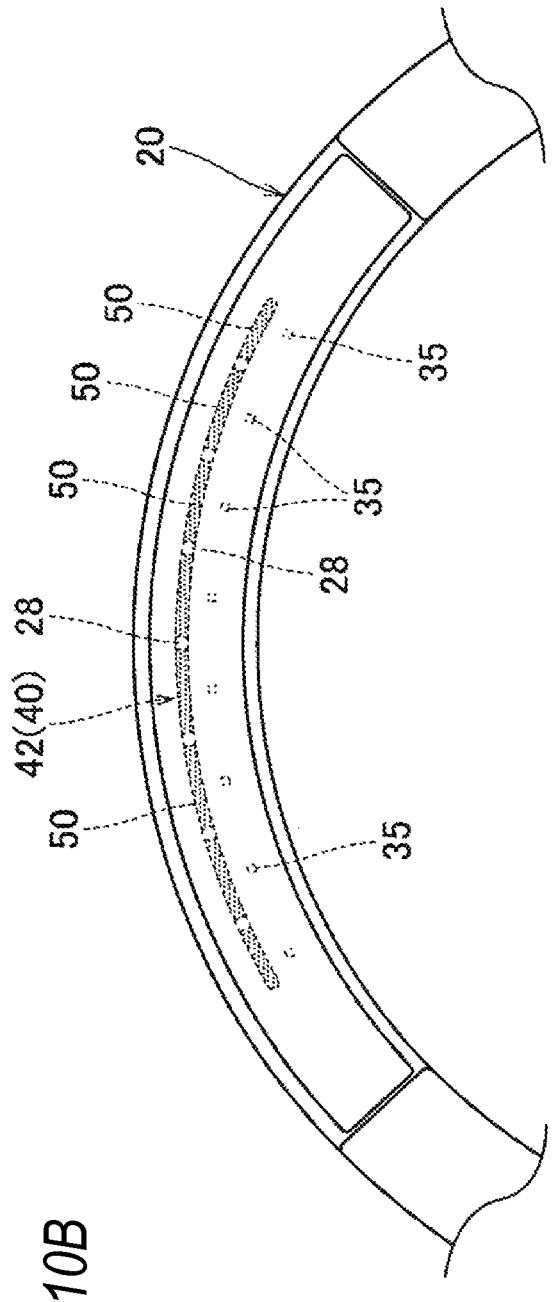

In the steering wheel 1 according to the embodiment, the visible light LEDs 35 are turned on by receiving an operation signal from an operation circuit (not illustrated), for example, when calling attention to the driver. In the steering wheel 1 according to the embodiment, when a visible light LED 35A (for example, only the one on the right end side) is turned on (an adjacent visible light LED 35B is turned off), as illustrated in FIG. 10A, only a divided body 50A on the right end side in the opening side portion 42 of the light guide body is turned on, and when all of the visible light LEDs 35 are turned on, as illustrated in FIG. 10B, all of the divided bodies 50 in the opening side portion 42 of the light guide body 40 are turned on (a turn-on state is indicated with shading).

In the steering wheel 1 according to the embodiment, the light guide body 40 is partitioned such that at least the regions of the opening side portion 42 disposed to extend from the back surface side to the front surface side of the substrate 30 are separated from each other at the parts between the visible light LEDs 35 with the partition wall portions 28 serving as the light shielding member interposed therebetween. Therefore, for example, when only the visible light LED 35A disposed in the region of one opening side portion 42 (for example, the region of the divided body 50A on the right end side in FIG. 10A) is turned on (the adjacent visible light LED 35B is turned off), the visible light VL which illuminates the divided body 50A on the right end side can be prevented from being diffused to another opening side portion (the adjacent divided body 50B in FIG. 10A), and the other opening side portion (the divided body 50B) can be prevented from being illuminated (see FIG. 10A). Therefore, in the steering wheel 1 according to the embodiment, it is possible to accurately illuminate only a part of the opening side portion 42 of the light guide body 40 adjacent to the partition wall portion 28.

Therefore, in the steering wheel 1 according to the embodiment, it is possible to accurately illuminate only a partial region of the light bar 20.

Figure 8A:
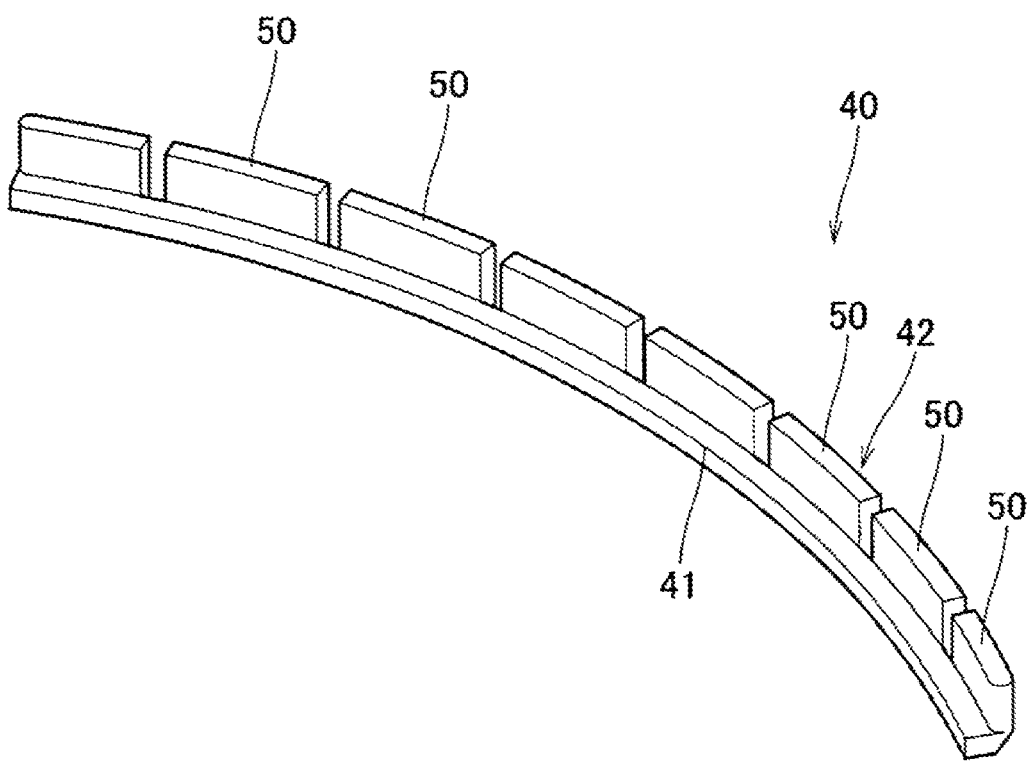
FIGS. 8A and 8B are schematic perspective views of a light guide body used in the light bar of the steering wheel according to the embodiment.
Figure 8B:
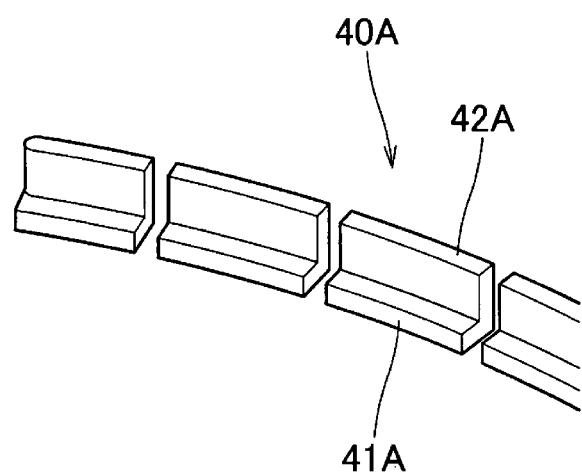

In addition, in the steering wheel 1 according to the embodiment, the light guide body 40 is configured such that only the region of the opening side portion 42 is partitioned and the light source side portion 41 is integrated. Therefore, as compared with a case in which the light guide body is divided into a plurality of parts including the light source side portion, the handling workability of the light guide body is improved, and the number of manufacturing steps at the time of manufacturing can be reduced. If such a point is not taken into consideration, a light guide body 40A may be configured to include a plurality of divided bodies in which not only a region of an opening side portion 51A but also a region of a light source side portion 42A is divided, as illustrated in FIG. 8B.

In the steering wheel 1 according to the embodiment, the light shielding members interposed between the divided bodies 50 formed by dividing the opening side portion 42 of the light guide body 40 are formed by the partition wall portions 28 extending from the bottom wall portion 23 of the case 22 as the holding member, so that it is possible to reduce an increase in the number of components and to improve workability at the time of assembly. Of course, if such a point is taken into consideration, the light shielding member may not be formed integrally with the holding member, and a light shielding member separate from the holding member may be provided.

Figure 11A:
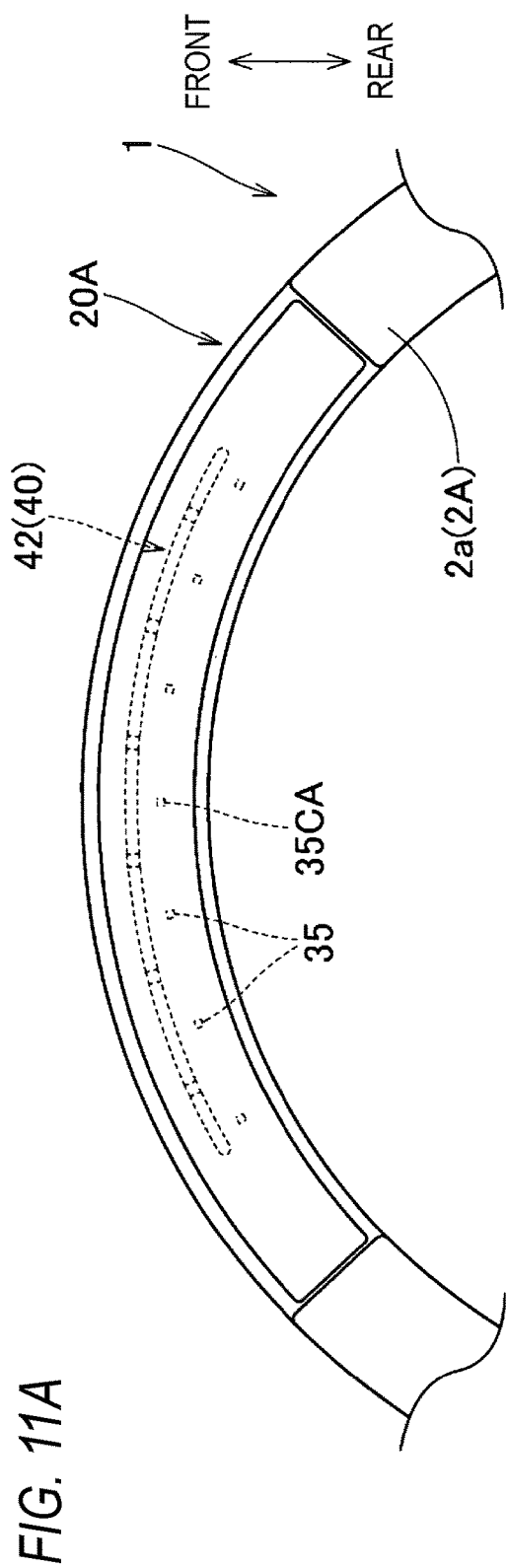
FIGS. 11A and 11B are schematic partial enlarged plan views illustrating a light bar and a state in which a visible light LED is turned on in a steering wheel according to another embodiment of the present disclosure.
Figure 11B:
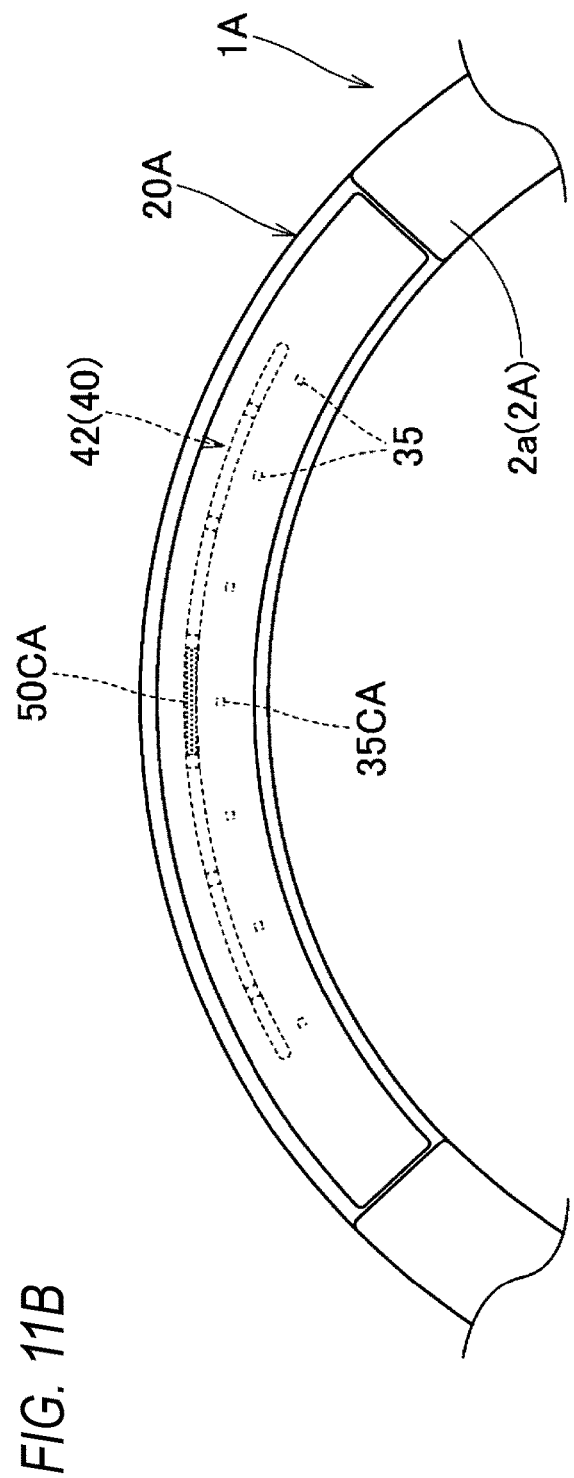

In the steering wheel 1 according to the embodiment, an even number (eight) of visible light sources 35 are disposed. Alternatively, as in a steering wheel 1A illustrated in FIGS. 11A and 11B, an odd number (seven in the illustrated example) of visible light LEDs 35 may be disposed in a light bar 20A, which is disposed on an upper surface side of a ring portion 2A in a front region at the time of straight traveling steering. The steering wheel 1A has the same configuration as the steering wheel 1 described above except for the number of visible light LEDs 35 (the number of divided bodies 50A). In the steering wheel 1A, a center-side visible light LED 35CA located on a center side is disposed on the front side of the steering center of the ring portion 2A at the time of straight traveling steering. In the steering wheel 1A having such a configuration, as illustrated in FIG. 11B, by turning on or blinking the center-side visible light LED 35CA, only a center-side divided body 50CA disposed corresponding to the center-side visible light LED 35CA can be illuminated, and the driver can visually recognize a position on the front side of the steering center of the ring portion at the time of straight traveling steering. Therefore, for example, when the driver wants to recognize a rotation state of the steering wheel 1A at a time of automatic driving or the like, a region in front of the steering center can be accurately visually recognized.

Figure 12:
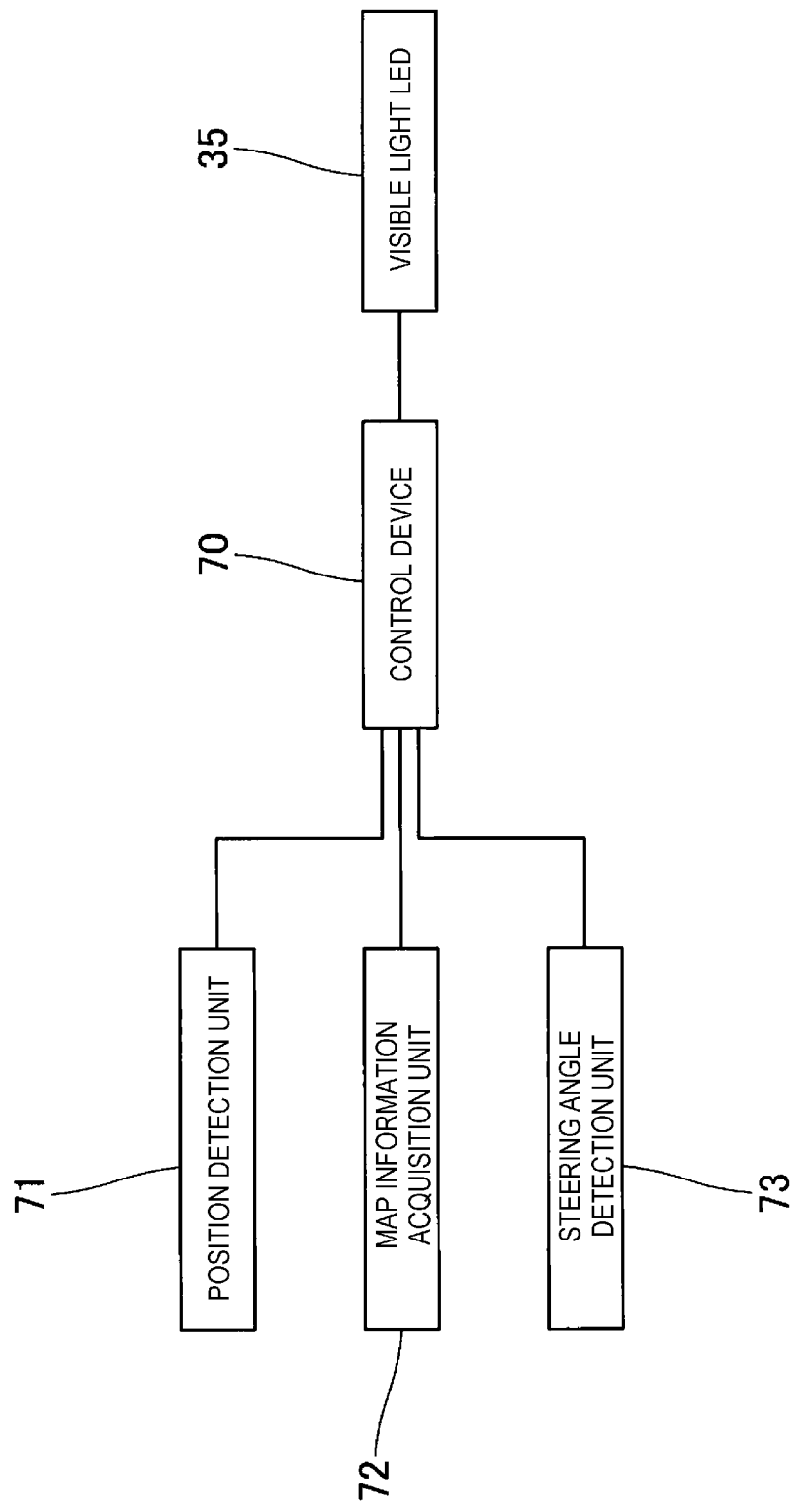
FIG. 12 is a block diagram illustrating a control device which controls turning-on of the visible light LED in the steering wheel according to the embodiment.

Further, the steering wheel 1 according to the embodiment may be configured such that each visible light LED 35 is connected to a control device 70 as illustrated in FIG. 12, and the control device 70 controls turning-on.

As illustrated in FIG. 12, the control device 70 includes a position detection unit 71 capable of detecting a position of the vehicle during traveling, a map information acquisition unit 72 capable of acquiring map information around the vehicle, and a steering angle detection unit 73 capable of detecting a steering angle of the steering wheel 1 during traveling of the vehicle. As the position detection unit 71 and the map information acquisition unit 72, a car navigation system (not illustrated) mounted on the vehicle can be used. The steering angle detection unit 73 constantly detects the rotation angle of the steering wheel 1.

The control device 70 is set to turn on one or a plurality of visible light LEDs 35 to be turned on as a steering angle shortage notification mode when steering angle shortage is detected during traveling. Specifically, when the control device 70 detects which the steering angle of the steering wheel 1 detected by the steering angle detection unit 73 is smaller than a position of the vehicle detected by the position detection unit 71 and the map information acquisition unit 72 and a curvature of a curve of a scheduled traveling portion on a road on which the vehicle is traveling or the like, the control device 70 turns on the visible light LED in the steering angle shortage notification mode.

Figure 13:
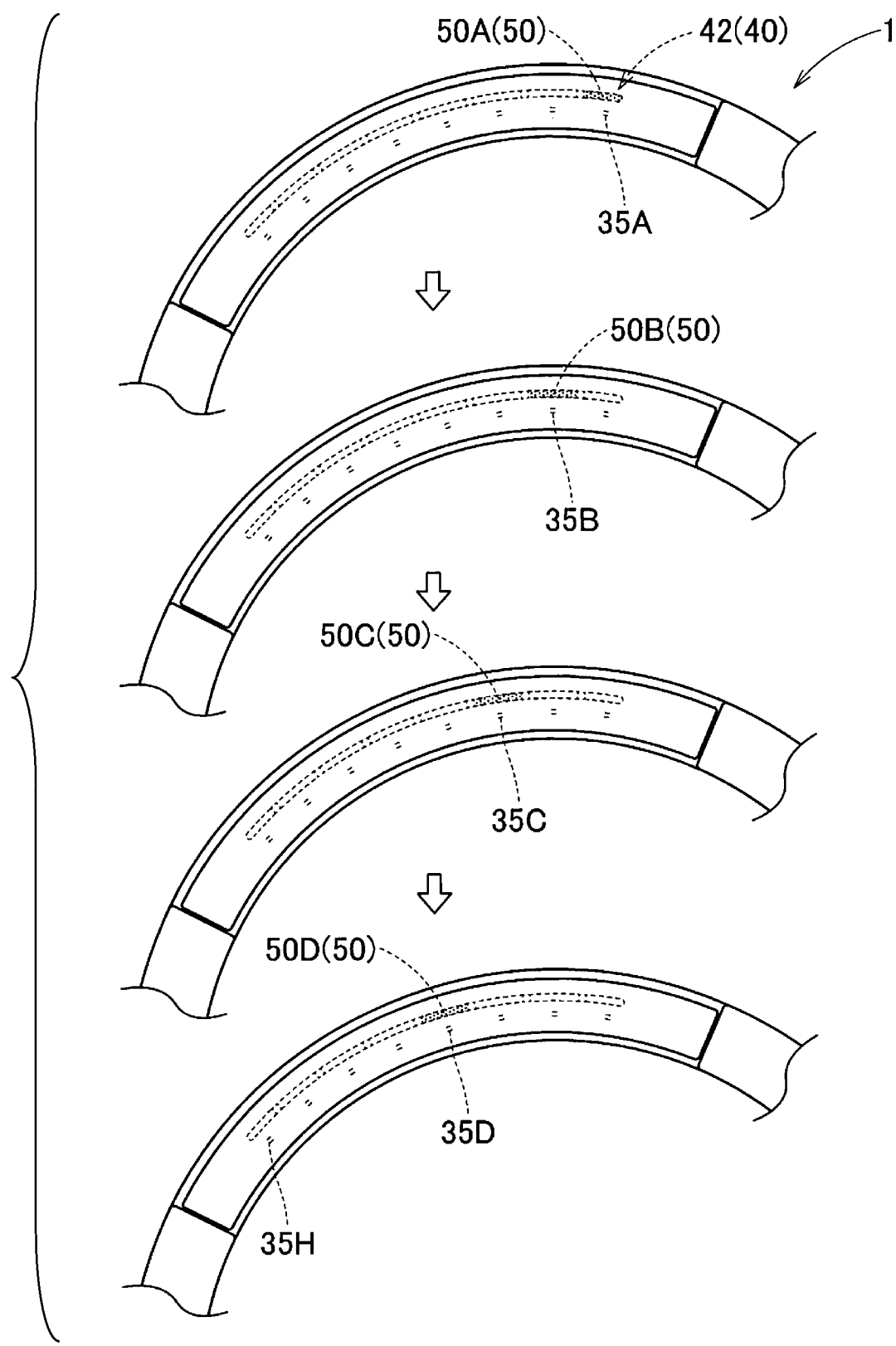
FIG. 13 is a schematic diagram illustrating an example of a turning-on pattern of the visible light LED controlled by the control device in the steering wheel according to the embodiment.
Figure 14:
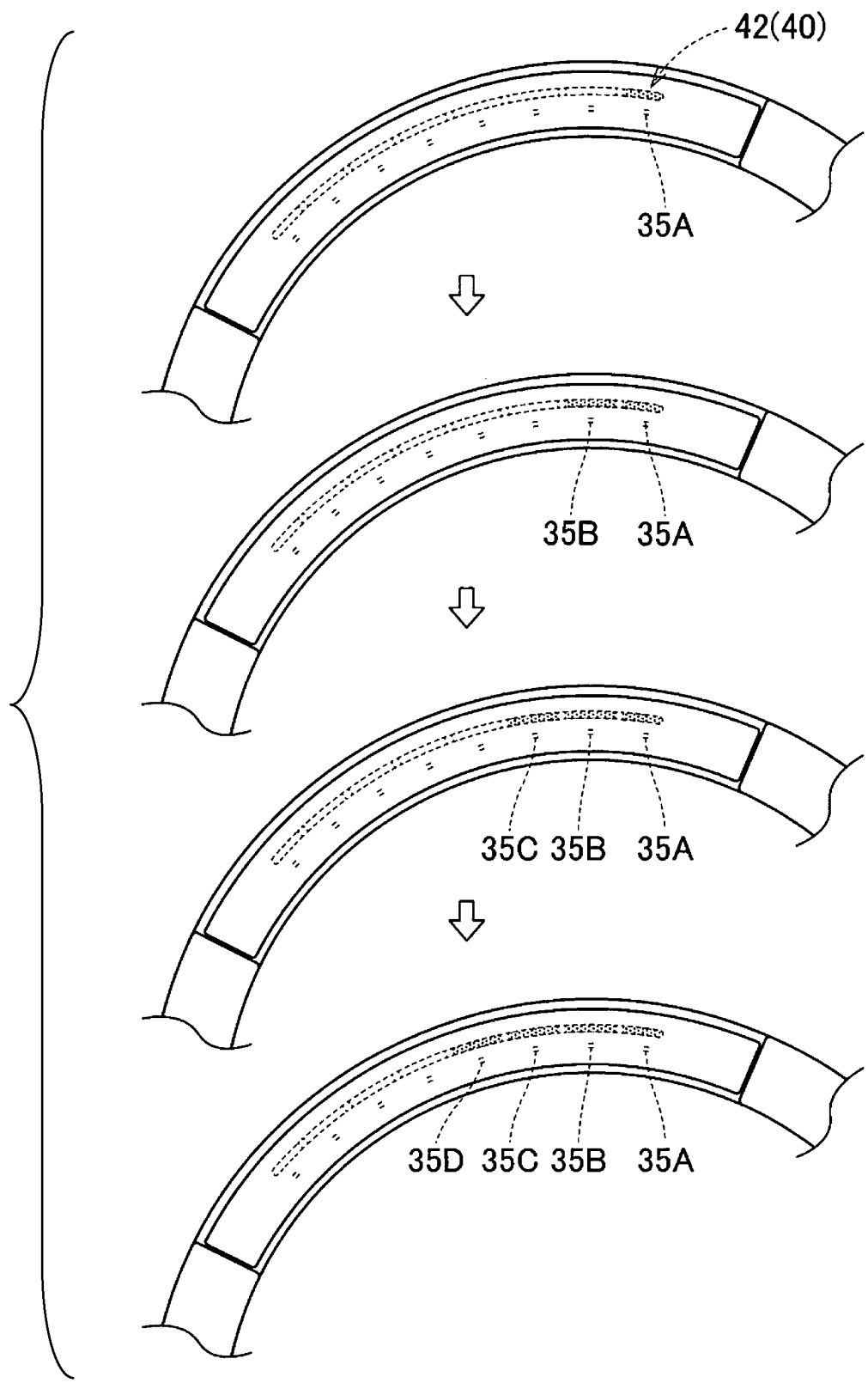
FIG. 14 is a schematic diagram illustrating another example of the turning-on pattern of the visible light LED controlled by the control device in the steering wheel according to the embodiment.

As a turning-on pattern of the visible light LEDs 35, it is preferable to sequentially turn on the visible light LEDs 35 toward a rotation direction side of the steering wheel 1 so as to alert the driver to recognize the shortage of the steering angle. For example, as illustrated in FIG. 13, when the shortage of the steering angle is detected in a state where the steering wheel 1 is rotated to the left to some extent, the visible light LEDs 35 are sequentially turned on and off from the right visible light LED 35A, which is on a side away from the rotation direction, to left visible light LEDs 35B, 35C, and 35D (although detailed illustration is omitted, up to a left visible light LED 35H, which is on the rotation direction side), and the turning-on of the visible light LEDs 35 is controlled so as to repeat this operation, so that the divided bodies 50 (50A, 50B, 50C, and 50D) corresponding to the respective visible light LEDs 35 are sequentially illuminated in the opening side portion 42 of the light guide body 40, and the driver can visually recognize that the light flows to the left (the direction side to which the steering wheel 1 should be rotated). In this case, for example, an turning-on interval of the visible light LEDs 35 can also be changed according to the magnitude of a difference between an actual steering angle and a steering angle required for curve travel. For example, when the difference between the actual steering angle of the steering wheel 1 and the steering angle required for the curve travel is large, the turning-on interval of the visible light LEDs 35 is reduced to cause the light to flow fast, and the turning-on interval of the visible light LEDs is increased as the difference becomes smaller along with the further rotation steering of the steering wheel 1, and all of the visible light LEDs are turned off when the difference becomes zero, so that the actual rotation operation of the steering wheel can be accurately supported. As illustrated in FIG. 14, the turning-on pattern of the visible light LEDs 35 may be set such that in a state in which the steering wheel 1 is rotated to the left to some extent, the visible light LEDs 35 are sequentially turned on from the visible light LED at the right end, which is the side away from the rotation direction, and the number of the visible light LEDs 35 in the turned-on state is increased (the number of illuminated regions of the opening side portion 42 is increased). Such a turning-on pattern of the visible light LEDs is merely an example, and the turning-on pattern of the visible light LEDs in the steering angle shortage notification mode is not limited to the above pattern.

In this way, when the control device 70 controls the turning-on of each visible light LED 35 of the steering wheel 1, for example, when a steering angle shortage is detected during a curve traveling of the vehicle, one or more visible light LEDs 35 are turned on as the steering angle shortage notification mode, and the driver can recognize the shortage of rotation of the steering wheel 1. Therefore, it is possible to accurately reduced the occurrence of an accident due to insufficient rotation of the steering wheel 1 (insufficient turning of the curve during traveling) during the curve traveling. Further, in the steering wheel 1 according to the embodiment, the light guide body 40 which guides the visible light VL emitted from the visible light LED 35 to the radiation opening 22a side is separated from each other (divided into the divided bodies 50) with the partition wall portions 28 as the light shielding members interposed between the visible light LEDs 35 in the region of the opening side portion 42, so that when the visible light LED 35 is turned on, only the divided body 50 corresponding to the visible light LED 35 which is turned on can be accurately illuminated. That is, only a predetermined portion of the light guide body 40 can be accurately illuminated, and the driver can be accurately alerted.

The steering wheel 1 according to the embodiment includes the annular ring portion 2, but the steering wheel to which the present invention can be applied is not limited to the configuration including an annular ring portion. For example, the present invention can also be applied to a steering wheel including a square annular ring portion, or a steering wheel including a rod-shaped grip portion which partially protrudes from the boss portion instead of the ring portion.

What is claimed is:

1. A steering wheel comprising,
a light bar disposed at a predetermined position which is capable of being visually recognized by a driver,
wherein the light bar includes:
   a substrate held by a holding member; and
   a plurality of visible light sources attached to be arranged side by side substantially along a longitudinal direction of the substrate and configured to emit visible light when turned on,
the light bar is configured to emit the visible light during operation from a radiation opening formed by opening a part of the holding member,
wherein the substrate is held by the holding member to be substantially along an opening surface of the radiation opening,
wherein the visible light sources are arranged side by side substantially along the longitudinal direction of the substrate on a back surface side of the substrate away from the radiation opening, and visible light emitted by the visible light sources is deflected toward the radiation opening side via a light guide body disposed to extend from the back surface side to a front surface side of the substrate,
wherein the light guide body includes:
   a light source side portion located on the visible light sources side, which is the back surface side of the substrate; and
   an opening side portion disposed to extend from the back surface side to the front surface side of the substrate while intersecting the light source side portion,
the light guide body has a substantially L-shaped cross section, and
wherein the light guide body is partitioned such that at least regions of the opening side portion are separated from each other at least at one location between the visible light sources with a light shielding member interposed therebetween.

2. The steering wheel according to claim 1,
wherein the light guide body is configured such that only the regions of the opening side portion are partitioned and the light source side portion is integrated.

3. The steering wheel according to claim 1,
wherein the light bar is curved such that a longitudinal direction thereof is substantially along a circumferential direction of a ring portion to be gripped by the driver, and the light bar is disposed in a front region at a time of straight traveling steering on an upper surface side of the ring portion, and
wherein an odd number of the visible light sources are arranged substantially along the circumferential direction of the ring portion, and a center-side visible light source located on a center side is disposed at a position on a front side of a steering center of the ring portion at the time of straight traveling steering.

4. The steering wheel according to claim 1,
wherein the light bar is curved such that a longitudinal direction thereof is substantially along a circumferential direction of a ring portion to be gripped by the driver, and the light bar is disposed in a front region at a time of straight traveling steering on an upper surface side of the ring portion, and
wherein a plurality of the visible light sources are arranged substantially along the circumferential direction of the ring portion, and the plurality of the visible light sources are set such that one or a plurality of the visible light sources are turned on as a steering angle shortage notification mode when a steering angle shortage is detected during traveling by being controlled by a control device.

\* \* \* \* \*